INVENTORS
Denis William Harling
Roy Godfrey Beresford Hine
BY Kirschstein, Kirschstein & Ottinger
ATTORNEYS ARRANGEMENTS FOR DEMODULATING ELECTRIC CARRIER OSCILLATIONS THAT ARE MODULATED BY TELEVISION SIGNALS Filed Feb. 11, 1959

INVENTORS

Denis William Harling

Roy Godfrey Beresford Hine

BY Kirschstein, Kirschstein & Ottinger

ATTORNEYS

United States Patent Office 3,057,954

Patented Oct. 9, 1962

3,057,954

ARRANGEMENTS FOR DEMODULATING ELECTRIC CARRIER OSCILLATIONS THAT ARE MODULATED BY TELEVISION SIGNALS

Denis William Harling, Wembley, and Roy Godfrey Beresford Hine, Isleworth, England, assignors to The General Electric Company Limited, Kingsway, London, England Filed Feb. 11, 1959, Ser. No. 792,533
Claims priority, application Great Britain Feb. 14, 1958
4 Claims. (Cl. 178—7.3)

This invention relates to arrangements for demodulating electric carrier oscillations that are modulated by television signals.

More particularly the invention is concerned with arrangements of the kind for demodulating an electric carrier signal, which is formed by carrier oscillations that are amplitude modulated by television signals of the type in which the picture intelligence and synchronising pulses lie on opposite sides of a predetermined amplitude level, the modulation ratio being greater than unity.

An arrangement of this kind may comprise a demodulator which is arranged to heterodyne the carrier signal with electric oscillations having the same frequency as the carrier oscillations for the purpose of supplying the television signal to an output path. It is usual for the local oscillator which is arranged to supply the said electric oscillations to the demodulator to have its operating frequency and phase controlled by the electric carrier signal. Since, however, the modulation ratio of the carrier signal is greater than unity, the instantaneous phase of the carrier signal is reversed for short periods from time to time. For example, if the television signal is modulated on the carrier oscillations so that each synchronising pulse produces an increase in the amplitude of the carrier signal envelope (that is to say negative modulation), the picture intelligence will effect such a reversal if the instantaneous level of the picture intelligence exceeds a value which is dependent upon the modulation ratio. Above such a value the picture intelligence will also cause an increase in the carrier signal envelope but the carrier will then be of reverse phase.

It follows therefore that the oscillator may be locked so that the oscillations supplied thereby have either one of two phase conditions. If one of these two conditions is considered to be the normal one necessary for the required television signal to be supplied by the demodulator to the output path, the other condition is when the electric oscillations are reversed in phase with the result that the signal supplied by the demodulator is inverted.

One object of the present invention is to provide an arrangement which is arranged to ensure that the output signal is not inverted.

An arrangement which is in accordance with the present invention and which is of the kind specified comprises a demodulator which is arranged to heterodyne the carrier signal with electric oscillations having the same frequency as the carrier oscillations for the purpose of supplying the television signal to an output path, there also being provided means to add together portions of the carrier signal and the said electric oscillations to give a derived signal, and means which is responsive to the said derived signal to identify whether the carrier signal and the said electric oscillations are being supplied to the demodulator in the phase relationship for the signal supplied by the demodulator to be inverted and which is operable upon such a condition being detected to apply a correction so that the television signal supplied to the said output path is not inverted.

For the purpose of effecting the said correction, there may be a change-over switch in a path over which either the said electric oscillations or the carrier signal is supplied to the demodulator. Alternatively there may be a change-over switch between the demodulator and the said output path.

The said means which is responsive to the derived signal may comprise a circuit which supplies a signal by peak rectifying the derived signal and which has a time constant such that the signal supplied thereby has an appreciable alternating component in addition to a direct current component when the arrangement is operating in one of the two possible conditions but substantially no such alternating component when the arrangement is operating in the other condition, and means which operates to effect the said correction and which is responsive to the amplitudes of both the direct current and the alternating components of the signal supplied by the said circuit. In a preferred arrangement, there is substantially no alternating component when the arrangement is operating normally and the means which operates to effect the correction is arranged to do so when either the alternating component exceeds a predetermined value or the direct current component is less than a predetermined value.

One arrangement in accordance with the present invention of an arrangement for demodulating a vestigial sideband carrier signal will now be described by way of example with reference to the five figures of the accompanying drawings, in which FIGURE 1 shows the waveform of a television signal;

Figures 1, 2, 4, 5:
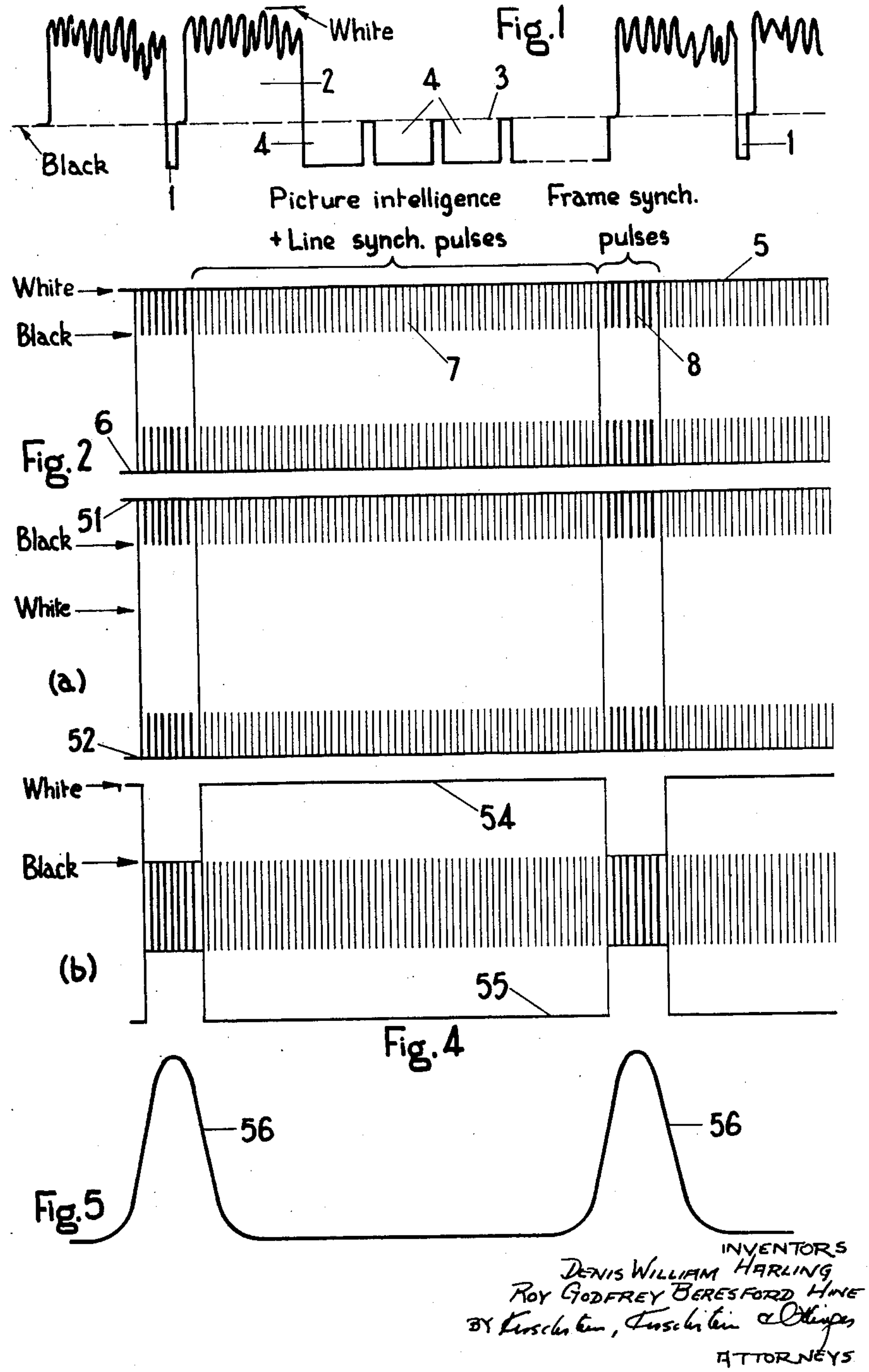
FIGURE 2 shows diagrammatically the waveform of the vestigial sideband carrier signal to be demodulated by the arrangement.
FIGURE 4 shows two alternative waveforms developed by the demodulating arrangement.
FIGURE 5 shows another waveform developed by the demodulating arrangement.

The arrangement now to be described is for demodulating a vestigial sideband carrier signal which is formed by carrier oscillations that are amplitude modulated by a television signal of the type at present transmitted by the British Broadcasting Corporation. The waveform of such a television signal is shown in FIGURE 1 of the accompanying drawings and it will be noted that the line synchronising pulses 1 and the picture intelligence 2 lie on opposite sides of the signal level 3 which corresponds to a black picture. At the end of each frame scan, no picture intelligence is transmitted for a period equal to that of a plurality of line scans but at this time there is instead transmitted a plurality of frame synchronizing pulses 4, adjacent frame synchronising pulses being separated from one another by a period equal to that of a line synchronising pulse.

The modulation ratio of the carrier signal is greater than unity so that the phase of the carrier reverses when the instantaneous level of the picture intelligence exceeds a predetermined value. FIGURE 2 of the accompanying drawings shows diagrammatically the waveform of the carrier signal, the envelope of the signal being represented by the lines 5 and 6 while the line synchronising pulses 1 (of FIGURE 1) give rise to the vertical lines 7 and the frame synchronising pulses 4 give rise to somewhat thicker lines 8. The instantaneous amplitudes of the carrier signal corresponding to the picture intelligence being black and white are as shown on this diagram. The carrier signal may be produced by a modulator as described in British patent specification No. 771,366.

Figure 3:
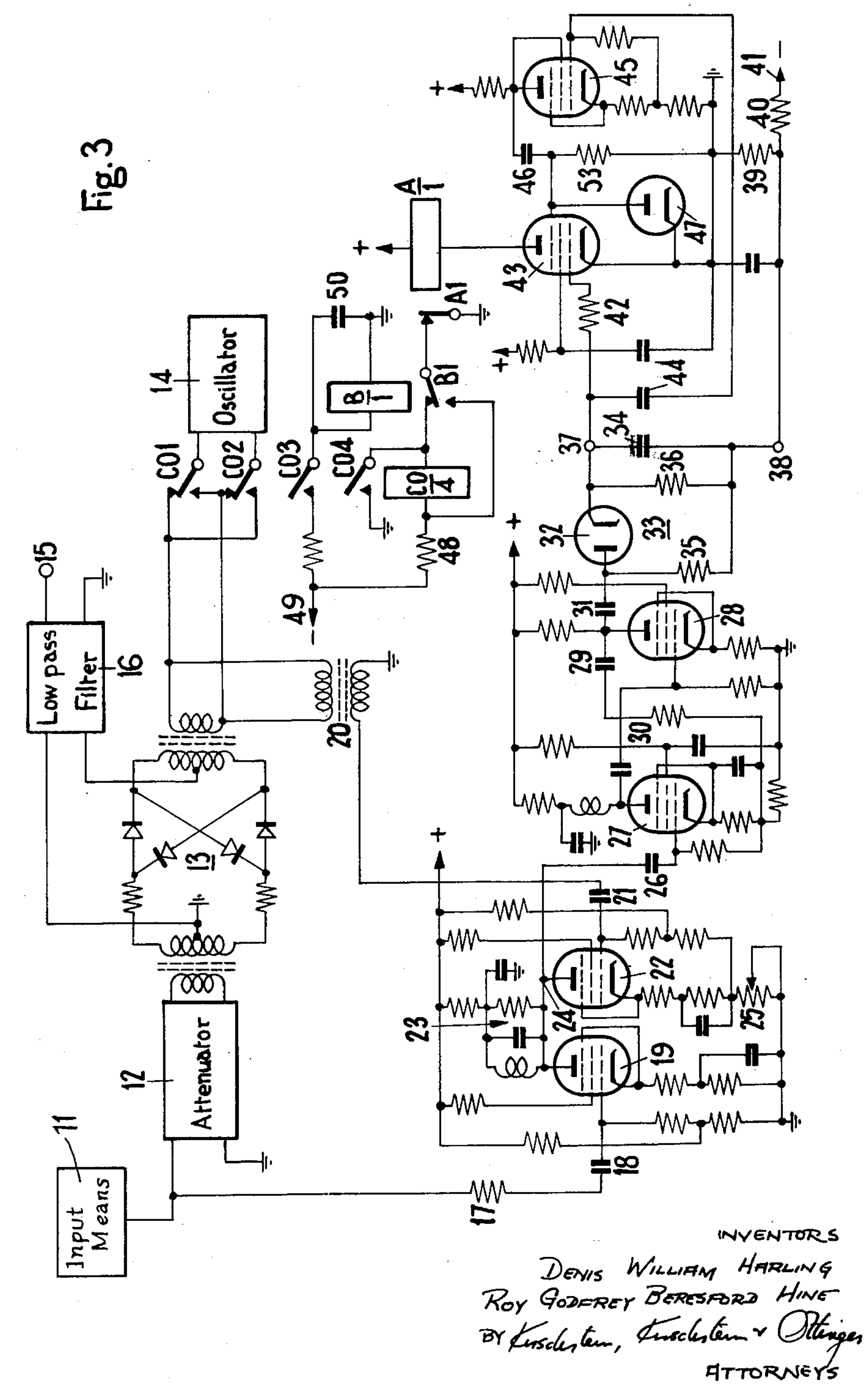
FIGURE 3 shows the circuit of the demodulating arrangement.

Referring now to FIGURE 3 of the accompanying drawings, the vestigial sideband carrier signal to be demodulated is supplied by input means 11 and this signal is passed through an attenuator 12 to a demodulator 13 which is arranged to heterodyne the carrier signal with locally generated oscillations supplied by an oscillator 14. It is necessary for the frequency of the oscillations supplied by the oscillator 14 to be equal to the carrier frequency and to have a predetermined phase relationship with respect to the carrier frequency. For this purpose the oscillator 14 may be arranged to be controlled in the manner described in British patent specification No. 817,059 with particular reference to FIGURE 2 thereof. As mentioned earlier in this specification, such control of the oscillator 14 gives one of two possible phase relationships between the carrier signal and the locally generated oscillations. In one condition the demodulator 13 supplies the required television signal to an output terminal 15 by way of a low pass filter 16 while in the other condition, in which the phase of the electric oscillations is reversed, the output signal developed at the terminal 15 is inverted. If the signal developed at the output terminal 15 is inverted, it is, of course, merely necessary to reverse the phase of the electric oscillations supplied from the oscillator 14 to the demodulator 13 and in the present circuit, this is effected by means of a change-over switch which is constituted by contacts CO1 and CO2 of an electromagnetic relay CO/4. The manner in which the relay CO/4 is operated so as to ensure that the locally generated oscillations supplied to the demodulator 13 are correctly phased will now be considered.

A portion of the carrier signal applied to the input terminal 11 is supplied by way of a resistor 17 and a capacitor 18 to the control grid of a pentode thermionic valve 19 while a portion of the locally generated oscillations supplied to the demodulator 13 is passed by way of a transformer 20 and a capacitor 21 to the control grid of another pentode thermionic valve 22. The valves 19 and 22 are arranged in similar manner as amplifier stages and in fact these two valves have a common anode load 23 with the result that the signal developed at the point 24 is, in effect, the sum of the voltage signals supplied to the two valves 19 and 22. A variable resistor 25 is connected in the cathode circuit of the valve 22 for the purpose of enabling the relative amplitude of the two voltages being added together to be varied.

The derived signal developed at the point 24 is passed by way of a capacitor 26 to two pentode thermionic valves 27 and 28 which are arranged as two cascade-connected amplifier stages. Some negative feedback is provided across these two amplifier stages by virtue of a capacitor 29 and a resistor 30 which are connected between the anode of the valve 28 and the cathode circuit of the valve anode of the valve 28 and the cathode circuit of the valve 27.

The signal passed by the valve 28 is fed through a capacitor 31 to the anode of a diode thermionic valve 32 which is connected in a peak rectifier circuit 33, the output voltage of the circuit 33 being developed across a capacitor 34. The time constant of the circuit 33 is required to have a value between 100 microseconds and about 20 milliseconds and in the arrangement being described, the resistor 36 and the capacitor 34, which together determine the time constant of the circuit 33, have the following values:

| | | |
|---|---|---|
| Resistor **36** | megohms | 1 |
| Capacitor **34** | microfarads | 0.005 |

The output voltage supplied by the peak rectifier circuit 33 across the capacitor 34 is such that the point 37 is more positive than the point 38. In addition, the point 38 is connected to the junction of two series-connected resistors 39 and 40 which are themselves connected between a negative supply line 41 and earth. The resultant voltage is applied by way of a resistor 42 to the control grid of a pentode thermionic valve 43 which has the operating winding of a relay A/1 connected in its anode circuit, this relay being of the slow-to-release type.

Any low frequency alternating component of the voltage supplied by the peak rectifier circuit 33 is passed through a capacitor 44 to the control grid of another pentode thermionic valve 45 which is arranged as an amplifier stage. A capacitor 46 is connected between the anode of the valve 45 and the suppressor grid of the valve 43 while a diode thermionic valve 47 is arranged to clamp to earth potential the more positive side of the voltage passed to said suppressor grid.

The operating winding of the relay CO/4 connected in series with a resistor 48, change-over contacts B1 of an electromagnetic relay B/1, and normally closed relay contacts A1 between a negative supply line 49 and earth. Thus, if the relay A/1 is not operated when the relay B/1 is released, the relay CO/4 is caused to operate. In addition to changing over the contacts CO1 and CO2 to which reference has previously been made, operation of the relay CO/4 also causes normally open contacts CO3 and CO4 to be closed, the contacts CO3 completing the operating circuit for the relay B/1 while the contacts CO4 complete a holding circuit for the relay CO/4. The relay B/1 is slow to operate due to the fact that its operating winding is shunted by a capacitor 50 but when this relay does operate, the change-over contacts B1 cause both sides of the operating winding of the relay CO/4 to be earthed (assuming the relay A/1 is still not operated) whereupon the relay CO/4 releases. This in turn breaks the operating circuit of the relay B/1 but, due to the capacitor 50, there is again some delay in this relay releasing. When the relay B/1 does release, the operating circuit for the relay CO/4 is restored (again assuming the relay A/1 is still not operated) and this cycle is repeated until such time as the relay A/1 is operated.

Considering now the operation of the demodulating arrangement, it is convenient first to consider the situation when the oscillations supplied by the oscillator 14 to the demodulator 13 are substantially in phase with the oscillations of the carrier signal during the transmission of synchronising pulses, the output signal developed at the terminal 15 then being of correct polarity. Under these conditions the derived signal developed at the point 24 has a waveform as shown in FIGURE 4(*a*), the envelope of the waveform being represented by the lines 51 and 52, this envelope being defined by the tips of the synchronising pulses. Since the time constant of the peak rectifier circuit 33 is appreciably greater than the period between successive line synchronising pulses, a steady positive voltage is supplied by that circuit to the grid of valve 43. Little, if any, signal however is passed through the capacitor 44 to the control grid of the valve 45 so that the suppressor grid of the valve 43 develops no bias with respect to earth. The steady positive voltage supplied by the circuit 33 is however sufficient to render the valve 43 conducting and thereby to operate the relay A/1. Accordingly no operating circuit for either the relay CO/4 or the relay B/1 is set up and the position of the relay CO/4 is unchanged.

If, when the arrangement is first switched on, the locally generated oscillations supplied to the demodulator 13 is phased for the output signal to be inverted, the signal developed at the point 24 has the waveform shown in FIGURE 4(*b*). In this case the peaks of the waveform which are indicated by the lines 54 and 55, occur during the transmission of picture intelligence. The peak rectifier circuit 33 supplies a positive voltage as before but, in this case, there is some variation in the amplitude of the voltage supplied; upon occurrence of the frame synchronising pulses 4 (see FIGURE 1) at the end of each frame of the television signal, the time constant of the circuit 33 is insufficiently long to maintain the voltage across the capacitor 34 with the result that the voltage at the point 37 becomes appreciably more negative.

It follows from the above that when the locally generated oscillations supplied to the demodulator 13 are phased for inverted operation, there is an alternating component in the voltage supplied by the circuit 33, this component having a fundamental frequency equal to the frame repetition frequency, namely 50 cycles per second. This alternating component is supplied through the capacitor 44 to the control grid of the valve 45 with the result that there is developed at the anode of this valve a signal having the waveform shown in FIGURE 5, one pulse 56 occurring at the end of each frame of the television signal. The signal developed at the anode of the valve 45 is passed through the capacitor 46 to the suppressor grid of the valve 43 so that the valve 43 has no anode current between the pulses 56. The duration of each pulse 56 is insufficiently long to operate the relay A/1 and accordingly the contacts A1 are closed. The resulting circuit through the contacts A1 ensures that if the relay CO/4 is released at that time, it is caused to operate. Consequently, if the relay CO/4 is operated at that time, the circuit through the contacts A1 causes the relay B/1 to operate and thereby release the relay CO/4. In either case the phase of the locally generated oscillations supplied to the demodulator 13 is reversed so that the conditions previously discussed then prevail.

The operation of the arrangement so far has only been considered when the input signals contain picture intelligence. When, however, there is no such picture intelligence, the television signal then consisting only of line and frame synchronising pulses, the steady voltage supplied by the circuit 33, in the case where the oscillations supplied to the demodulator 13 are phased for inverted operation, is somewhat smaller but the arrangement still operates in the manner described to reverse the phase of the locally generated oscillations.

It will be appreciated that if the carrier signal is removed from the terminal 11, there is a decrease in the amplitude of the signal developed at the point 24 with the result that the magnitude of the voltage supplied by the circuit 33 falls. The arrangement is however such that the voltage supplied to the control grid of the valve 43 still enables sufficient anode current to flow to operate the relay A/1. This prevents the relays CO/4 and B/1 operating until such time as the carrier signal is applied to the terminal 11 with the wrong phase.

In the absence of any carrier signal or locally generated oscillations being supplied to the demodulator 13, the bias supplied to the control grid of the valve 43 causes that valve to be cut off and the relay A/1 is then released.

The arrangement described above with reference to the drawings may be modified by dispensing with the changeover relay CO/4 and arranging so that release of the relay A/1 affects the frequency and phase control of the oscillator 14. Thus, if release of the relay A/1 effectively interrupts the path (not shown) over which control signals are fed to the oscillator 14, the oscillator then runs free. If, however, the frequency at which the oscillator 14 then operates does not differ from the carrier frequency by more than about 7 to 10 cycles per second, a situation will be reached in which the locally generated oscillations supplied to the demodulator 13 are for a short time in the required phase with the result that the relay A/1 is re-operated so as to restore control of the oscillator 14 when it is correctly phased.

Effectively interrupting the control signal path in this manner may conveniently be brought about by reducing to zero the gain round the frequency control loop of the oscillator. For example, if the amplifier 27, in the circuit shown in FIGURE 2 of the drawing of said British patent specification No. 817,059, is a two-stage balanced amplifier, the first stage may be formed by two cathode-coupled triode valves to the control grids of which are supplied balanced signals passed by the filter 26. Two load resistors are connected between the anodes of these two triodes respectively and a common point while a resistor is connected between this common point and a positive supply line. A pair of normally-closed contacts of the relay A/1 are connected between the said common point and earth. Thus when the oscillator 14 is wrongly phased, the relay A/1 is released thereby closing these contacts and removing the anode supply from the two valves. Under these conditions no signal is passed through the second stage of the amplifier to the oscillator which therefore runs free.

We claim:

1. Television-signal demodulating equipment including, input means which supplies a signal to be demodulated, said signal comprising an electric carrier signal which is formed by carrier oscillations that are amplitude modulated by television signals of the type in which picture intelligence and synchronising pulses lie on opposite sides of a predetermined amplitude level, the modulation ratio being greater than utility so that the instantaneous phase of said carrier signal is reversed for short periods from time to time, oscillator means arranged to supply electric oscillations having the same frequency as said carrier oscillations, means to lock the phase of said electric oscillations in phase with either of the possible phases of said carrier signal, a single-stage demodulator which is arranged to heterodyne said carrier signal with said electric oscillations for the purpose of deriving said television signals, means to add together portions of said carrier signal and said electric oscillations to give a derived signal, and means responsive to said derived signal to recognise when the phase of said carrier and the phase of said electric oscillations are so related that said television signals supplied by said demodulator are inverted and which, upon such condition being recognised, causes said phases to be reversed relative to one another so that said television signals derived by said demodulator are not then inverted.

2. Television-signal demodulating equipment according to claim 1 wherein the means responsive to said derived signal comprises an electric circuit which supplies a signal by peak rectifying said derived signal and which has a time constant such that the signal supplied thereby has an appreciable alternating current component in addition to a direct current component when the arrangement is operating in one of the two possible conditions but substantially no such alternating current component when the arrangement is operating in the other condition, and means which operates to reverse the phase of said oscillations, prior to said electric oscillations being supplied to the demodulator, and which is responsive to the amplitudes of both the direct current and the alternating current components of the signal supplied by said circuit.

3. Television-signal demodulating equipment according to claim 2 wherein the means which operates to reverse the phase of said electric oscillations, prior to the electric oscillations being supplied to the demodulator, is arranged to do so when said alternating current component exceeds a predetermined value and is also arranged to do so when said direct current component is less than the predetermined value, there being substantially no alternating current component when the arrangement is operating such that the television signals derived by the demodulator are not inverted.

4. Television-signal demodulating equipment including input means which supplies a signal to be demodulated, said signal comprising an electric carrier signal which is formed by carrier oscillations that are amplitude modulated by television signals of the type in which picture intelligence and synchronising pulses lie on opposite sides of a predetermined amplitude level, the modulation reatio being greater than unity so that the instantaneous phase of said carrier signal is reversed for short periods from time to time, oscillator means arranged to supply electric oscillations having the same frequency as said carrier oscillations, means to lock the phase of said electric oscillations in phase with either of the possible phases of said carrier signal, a single-stage demodulator which is arranged to heterodyne said carrier signal with said electric oscillations for the purpose of deriving said television signals, means to add together portions of said carrier signal and said electric oscillations to give a derived signal, means periodically to cause the relative phasing of said carrier signal and said electric oscillations as supplied to the demodulator to be reversed, and means responsive to said derived signal to identify when said carrier signal and said electric oscillations are being supplied to the demodulator in the phase of relationship for said television signals derived by the demodulator not to be inverted and which operates upon such a condition being detected to inhibit further operation of the last mentioned means.

References Cited in the file of this patent

UNITED STATES PATENTS

| | | |
|---|---|---|
| 2,837,646 | Campbell | June 3, 1958 |
| 2,881,312 | Ressler | Apr. 7, 1959 |
| 2,899,643 | Slonczewski | Aug. 11, 1959 |